Figure 2:
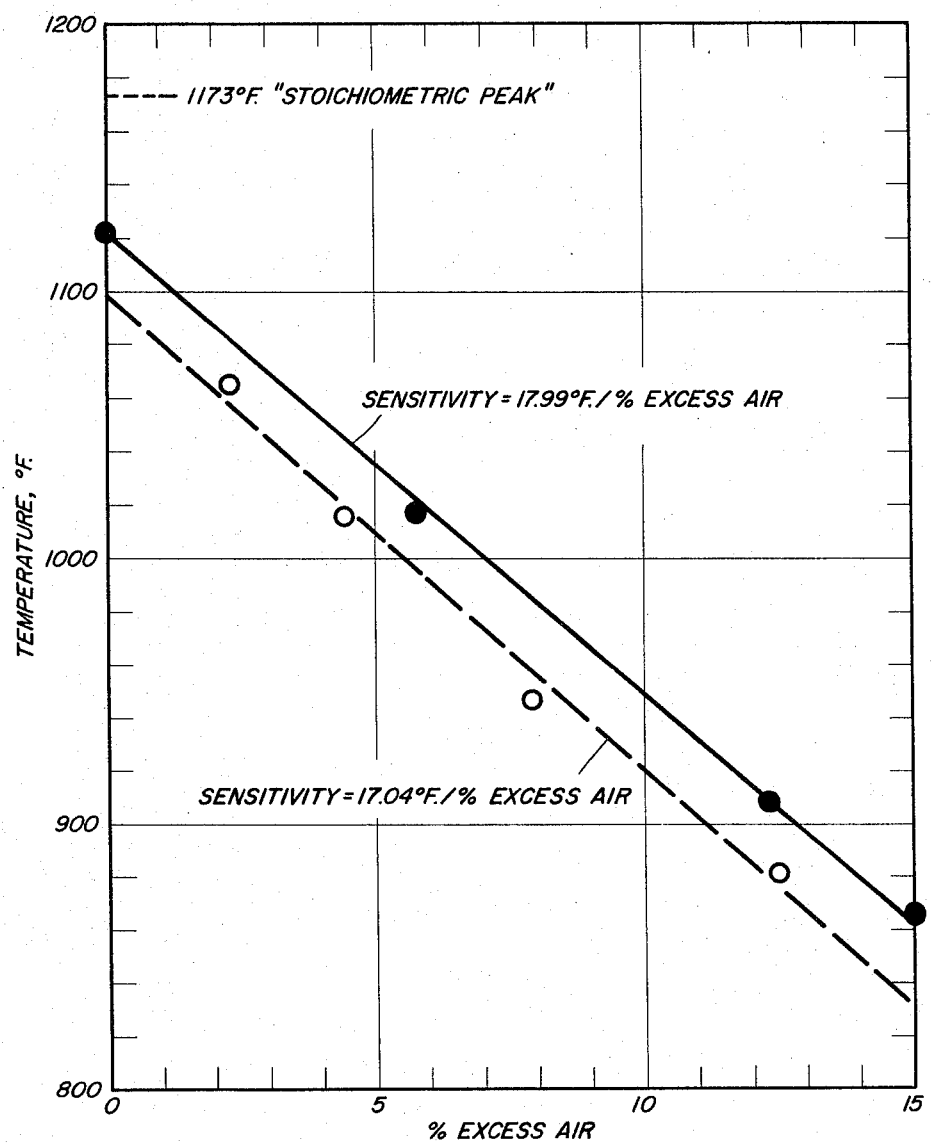

Jan. 31, 1967  J. E. GERRARD ETAL  3,301,715
THERMOCOUPLE FOR MULTIPLE BURNER COMBUSTION CONTROL
Filed Sept. 23, 1965  2 Sheets-Sheet 1
FIG. 1
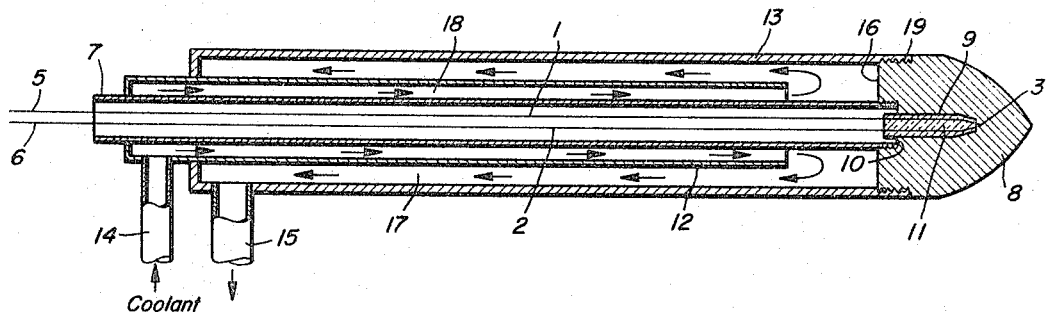
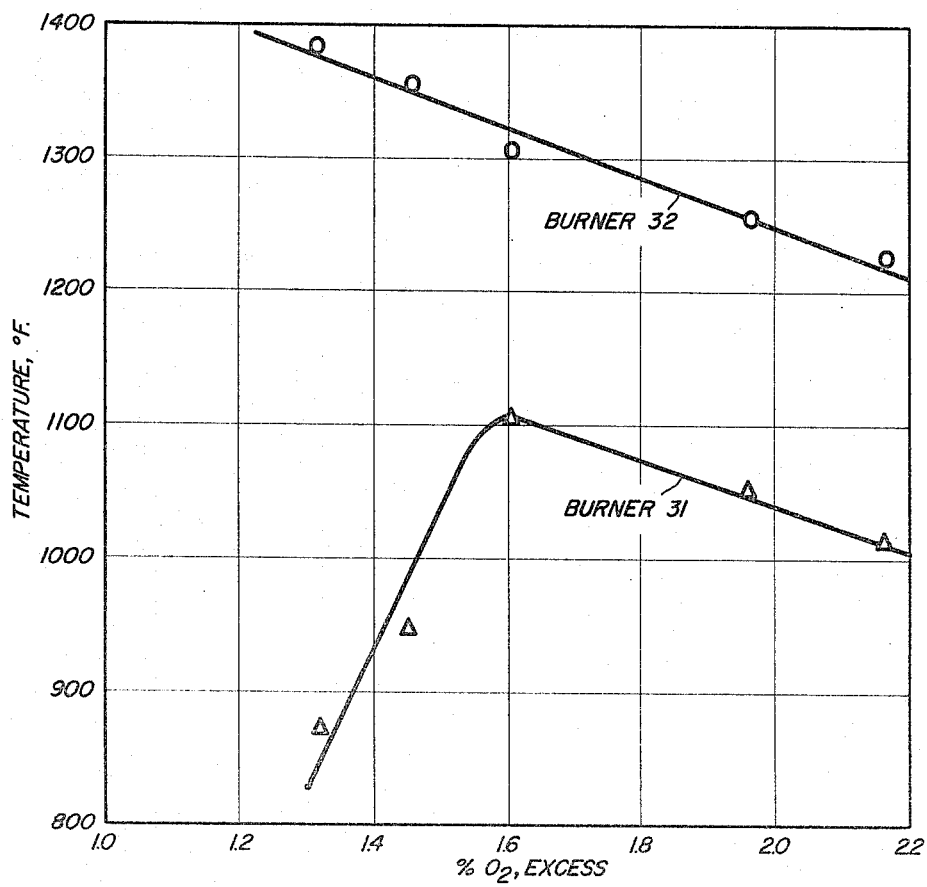
FIG. 3
JOHN E. GERRARD
JAMES PERCIVAL  INVENTORS
BY  *Henry Berk*
PATENT ATTORNEY United States Patent Office 3,301,715
Patented Jan. 31, 1967

3,301,715
THERMOCOUPLE FOR MULTIPLE BURNER
COMBUSTION CONTROL
John E. Gerrard, 41 Overlea Lane, Matawan, N.J.
07747, and James Percival, 3 Roney Road, Iselin, N.J.
08830
Filed Sept. 23, 1965, Ser. No. 489,569
3 Claims. (Cl. 136—222)

This invention provides a new thermocouple assembly useful for monitoring flame temperatures by which the level of excess air employed in individual burners can be controlled.

Low excess air, i.e., excess above the stoichiometric requirement for combustion of oil fuel in a furnace greatly reduces slagging, reduces corrosion, and permits efficient combustion if the excess air level is properly controlled. In a multiple burner furnace, insuring the same level of air:fuel ratio for each burner is very important for proper control.

As set forth in U.S. patent application Serial No. 447,293, filed by C. W. Siegmund and J. E. Gerrard, April 12, 1965, monitoring of the flame temperatures of individual burners can be used to adjust the air-to-fuel ratios for each burner in a multiple-burner residual-fuel-fired furnace so that the burners are balanced to operate at a desired level of excess air.

Critical and practical requirements arose in developing a system for monitoring the flame temperatures to control the air-to-fuel ratios of the burners with respect to the temperature sensing element and the way in which it is used.

The temperature sensing element must withstand the severe conditions within the flame. It must be mechanically strong, be resistant to coking, resistant to excessive corrosion, and resistant to any change in configuration which would cause erratic results not correlated with the flame temperature. Further, it is important to be able to place the sensing element in the proper place in a flame, where steady state conditions are established and then have sufficient precision and sensitivity for producing the signal needed to make adjustments in air feed, fuel feed, or both to each burner.

The thermocouple assembly and utilization provided by the present invention satisfies the requirements mentioned. This thermocouple assembly includes a fundamental thermocouple element comprising two conductors of dissimilar metals joined at one end to form a hot junction or measuring junction, where the temperature is to be measured, the other ends or terminals of said conductors being kept at a cold reference temperature at which an electric potential (E.M.F.) is developed.

The fundamental thermocouple element and some of the known associated parts are described in the "Chemical Engineers Handbook" by John H. Perry. As shown in this and other references on the subject of thermocouples, there are other factors in a thermocouple assembly most suitable for any particular use and no such assembly has been suitable for installation in the direct path of a flame prior to the present invention.

In essence, the presently invented thermocouple assembly suitable for installation in the direct path of a flame comprises a thermocouple element preferably of the base-metal wire type, its hot junction being imbedded in a metal tip which remains uncoated by coke and takes on a steady state shape by being cooled on a base side through which the element wires enter the tip. The cooled base side of the tip functions as a closure of a primary protecting tube that surrounds the element wires. The element wires are insulated where they enter and extend into the tip to their junction which makes contact with the tip metal. Cooling fluid, e.g., water, is made to flow to the base of the tip through an inner annular passage of a tubular heat exchange jacket and is made to flow out in a reverse direction through an outer annular passage of the jacket which surrounds the primary protecting tube. To achieve this effect, the jacket comprises an inner pipe which does not reach to the base of the tip and an outer concentric pipe to which the base of the tip is fastened, e.g., by threaded engagement.

The coolant enters the inner pipe from an inlet conduit, turns at the base of the tip to flow in the reverse direction to an outlet conduit from the outer pipe, said inlet and outlet conduits being located near the cold junction or terminal of the thermocouple.

A cross-sectional view of the thermocouple assembly is shown in the attached drawing FIG. 1.

Data points from representative test runs made with the thermocouple assembly properly installed are plotted in FIG. 2 and FIG. 3.

Referring to FIG. 1, the two parallel wires 1 and 2 of the element are dissimilar metals, e.g., Chromel and Alumel, or other combinations of metals suitable for use in measuring the temperatures to be monitored at their hot junction. These wires extend from their cold terminals 5 and 6 into an open end of the primary protecting tube to the end of this tube closed by the metal tip 8. They extend into a central bore hole 9 from the base part 10 of the tip and in this bore hole are insulated apart by heat resistant insulation 11, e.g., ceramic, to the hot junction 3 which makes contact with the metal tip 8.

Concentric with the primary protecting tube 8 is cooling jacket means comprising the inner tubing 12 and the outer tubing 13, with conduit inlet 14 for cold coolant fluid and conduit outlet 15 for the used coolant fluid. Tubing or pipe 12 does not reach to the base part of the tip 8 so that the coolant entering from conduit 14 at the other end flows into contact with the base surface 16 of the tip then flows in reverse direction through the annulus 17 to conduit outlet 15. The annulus or annular passage 17 between pipe 13 and pipe 12 may be made to have a larger area in the plane across the stream of coolant than the area in a plane across the stream of coolant flowing through annulus 18 toward the base surface 16 to compensate for expansion of the coolant on being heated. The tip 8 is fastened by threaded engagement at its periphery 19 to the outer tubing 13.

Modifications may be made to increase the cooling of the tip, e.g., by grooves into the base of the tip or fins.

The shape of the tip 8 shown in the drawing is ogival or arched and is an approximation of the steady state shape achieved after use for 80 hours in a flame of a boiler test unit with a 4-foot-long thermocouple model. Data from these runs proved the precision of this instrument. In these runs the stoichiometric peak was determined to be 1173° F. (i.e. 0% excess air). Plotting the temperatures determined with this probe for variations of percent excess air, as shown in FIG. 2, the points fell with good accuracy on a line starting at 1126° F. and this showed that the temperature changed (decreased) with increased excess air in a regular manner, e.g., 17.99° F. per 1% increase of excess which showed the sensitivity. There was a change in sensitivity to only 17.04° F. per 1% increase of excess air as the tip changed from its original shape to its steady state shape and registered a temperature about 26° F. lower.

A relatively short 4-foot prototype assembly was operated with about 3.5 liters per minute of cooling water flow through the cooling jacket. At this rate the maximum temperature rise in the water from inlet to outlet was about 90° F. Considering that there were minor fluctuations in the coolant flow rate and some changes in the tip during the long test period the test results showed a remarkably good alignment of temperatures with reference to percent excess air.

The described prototype thermocouple established a peak flame temperature slightly below the stoichiometric peak temperature and this is important in making adjustments of percent excess air to the flame temperature as indicated by the thermocouple.

Using a full size (18-foot length probe) for logging the flame temperatures in a furnace of a large boiler for indivdiual burners, the tip being stainless steel, there was no sign of corrosion or wear after more than 50 hours. In these tests the tip was found best to have a flatter or hyperbolic shape at its steady state to prevent coke deposition on the tip. In these tests, according to data plotted in FIG. 3, the flame from one burner 32 had higher temperatures below a stoichiometric peak and the temperatures had a definite linear relation to the percent excess air. The other burner 31 was shown to be operating at a lower flame temperature, first below its stoichiometric peak, then with excess air above said peak. By adjustment of fuel and air to the burner of lower flame temperature the burners were balanced to operate at the desired temperature level and with the same percent excess air in the range of 1 to 3% excess air.

In tests with the 18-foot probes, the cooling water flow rate was about 4 gal./min. and the temperature rise of the coolant, inlet to outlet was about 130° F. These temperatures were stable. The response of the probe in temperature (E.M.F.) changes was found to be fast and adequate for control purposes, automatically, manually, or both.

The method for balancing burners in a commercial boiler furnace is illustrated in the following example:

EXAMPLE

The thermocouples were extended into the burner flames so that their tips were in a region of equilibrium, i.e., where decreasing air increased the temperature and increasing fuel feed did likewise. Excess air was determined by flue gas measurements and calculations based on the amount of air required to burn the carbon and hydrogen in a known amount of oil fuel feed having a known C and H content.

The "stoichiometric peaks" are considered to be the maximum temperatures effected by the approach to complete combustion. With insufficient air, combustion is incomplete and the temperature is lower. Above the "stoichiometric peak" as more excess air is used, the overall combustion is enhanced for economy of fuel, and avoidance of smoke formation, but this is accompanied by lowering of the flame temperature. The flame temperatures of all the burners are not necessarily identical at the stoichiometric peaks, but with proper balancing of the air-to-fuel ratios, each of the flame temperatures is made to vary linearly with the air:fuel ratio.

The tests of the long thermocouple probes extending even horizontally into horizontally projected flames brought out several important results:

(1) The probes kept their shape, remained free of coke and of corrosion, and gave no fracture problem on having their tips placed into the flame and while remaining so.

(2) The temperature response of the thermocouple with its tip upstream of and within the flame directionally matched with the response of a photopyrometer and showed the high sensitivity change of temperature with excess air level.

(3 The tip showed no coking or change in configuration to upset the temperature determination when the tip reached a steady state shape.

In the tests the peaks were reproduced several times by maintaining a constant air flow and varying the flow of fuel controlled either by pneumatically operated valves or hand controlled valves.

Each burner was brought to its peak, then by cutting down on the fuel feeds, the burners were brought to the same level of excess air. The absolute levels of temperature in the individual flames are irrelevant so long as the slopes of the lines for temperature vs. percent excess air remain constant. Even with a discrepancy between slopes amounting to 20%, the difference in excess air to each of the burners was found to be only 1.2%.

Where, for instance, one burner was initially operating with 10.9% excess air, it was brought to the 3% level and another burner operating with insufficient air was brought to the same level, the overall excess air was decreased to 6.9%.

The invention described is claimed as follows:

1. A thermocouple assembly useful for sensing variations of temperature in a flame comprising:
    (a) a protecting tube;
    (b) a thermocouple element comprising a pair of wires extending from cold terminals through said protecting tube and joined at their forward ends to form a hot junction, said wires being spaced apart and from the interior wall of the protecting tube;
    (c) a refractory metal tip having a base surface, a central portion of which closes the protecting tube and into which the pair of wires extend, said hot junction being imbedded in the tip by means insulating said wires in the tip up to the hot junction; and
    (d) a cooling jacket surrounding said protecting tube and sealed to the tip, said jacket having inlet and outlet conduits for circulating a coolant along the exterior of the protecting tube to an annular portion of the base surface of the tip which forms a closure of the cooling jacket.

2. In the thermocouple assembly set forth in claim 1, said refractory metal tip being stainless steel having a disc shape base part fastened to the protecting tube and to the cooling jacket and having an outer arched surface that protrudes from the base part.

3. In the thermocouple assembly of claim 1, said cooling jacket comprising an inner tubing and an outer tubing concentrically surrounding the protecting tube to form an inner annular passage for the coolant circulated from the inlet conduit to the annular portion of the base surface of the tip and to form an outer annular passage for flowing the coolant in reversed direction from the annular portion of the base surface of the tip to the outlet conduit.

References Cited by the Examiner
UNITED STATES PATENTS

| | | | |
|---|---|---|---|
| 537,832 | 4/1895 | Simonds | 73—361 |
| 1,709,042 | 4/1929 | Siebert | 236—15 |
| 1,849,832 | 3/1932 | Herzog et al. | 136—4 |
| 2,324,821 | 7/1942 | Campbell | 236—15 |
| 2,340,899 | 2/1944 | Ray | 136—4 |

JAMES W. WESTHAVER, *Primary Examiner.*